United States Patent
Glowacki et al.

(10) Patent No.: US 6,705,949 B2
(45) Date of Patent: Mar. 16, 2004

(54) SHAFT SPLINE HAVING A STRAIGHT SIDE TOOTH PROFILE

(75) Inventors: Maciej Glowacki, West Bloomfield, MI (US); Walter Joseph Golembiewski, Washington, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 69 days.

(21) Appl. No.: 10/125,023

(22) Filed: Apr. 18, 2002

(65) Prior Publication Data

US 2003/0040371 A1 Feb. 27, 2003

Related U.S. Application Data

(60) Provisional application No. 60/315,373, filed on Aug. 27, 2001.

(51) Int. Cl.[7] .................................................. F16C 3/00
(52) U.S. Cl. .................... 464/183; 464/179; 403/359.1; 403/359.6
(58) Field of Search ................................ 464/183, 179; 403/359.1, 359.6

(56) References Cited

U.S. PATENT DOCUMENTS

| | | | |
|---|---|---|---|
| 1,541,007 A | 6/1925 | Theimer | |
| 1,779,805 A | 10/1930 | Dunwoodie | |
| 2,015,430 A | * 9/1935 | Matthews et al. | ........... 464/179 |
| 2,510,362 A | 6/1950 | Anderson | |
| 2,715,846 A | 8/1955 | Grob et al. | |
| 3,063,266 A | 11/1962 | Rabson | |
| 3,293,884 A | 12/1966 | Grob | |
| 3,405,982 A | * 10/1968 | Krenn | ...................... 403/359.6 |
| 3,638,455 A | 2/1972 | Francois | |
| 3,813,899 A | 6/1974 | Abrahamer | |
| 4,003,219 A | 1/1977 | Stull | |
| 4,125,000 A | 11/1978 | Grob | |
| 4,523,872 A | 6/1985 | Arena et al. | |
| 4,552,544 A | 11/1985 | Beckman et al. | |
| 4,622,022 A | 11/1986 | Diffenderfer et al. | |
| 4,819,755 A | 4/1989 | Smemo et al. | |
| 4,945,745 A | 8/1990 | Bathory et al. | |
| 5,230,658 A | 7/1993 | Burton | |
| 5,309,620 A | 5/1994 | Shinohara et al. | |
| 5,360,377 A | 11/1994 | Fernandez | |
| 5,515,955 A | 5/1996 | Victoria et al. | |
| 5,645,366 A | 7/1997 | Ishibashi et al. | |
| 5,655,968 A | 8/1997 | Burton | |
| 5,660,494 A | * 8/1997 | Schwarzler et al. | ...... 403/359.6 |

(List continued on next page.)

FOREIGN PATENT DOCUMENTS

| | | | |
|---|---|---|---|
| DE | 0707157 | 10/1995 | |
| EP | 0893613 A1 | 1/1999 | |
| GB | 0549696 | * 12/1942 | ................. 464/179 |
| GB | 2197429 | 5/1988 | |
| JP | 08-254216 | 10/1996 | |

Primary Examiner—Lynne H. Browne
Assistant Examiner—Aaron Dunwoody
(74) Attorney, Agent, or Firm—Brinks Hofer Gilson & Lione

(57) ABSTRACT

A shaft adapted for connection to another shaft in a manner that transfers rotational movement is provided. The shaft bears a spline comprising a plurality of teeth. Each tooth has a profile that enhances surface contact between the shaft and a second shaft, thereby leading to enhanced fit between the shafts. Each tooth includes a top surface and first and second sides. Each of the first and second sides has a straight portion disposed between top and bottom transition regions. In a preferred embodiment, the length of each straight portion is between approximately 0.6 and 0.9 times the overall length of the appropriate side. Also, the pitch diameter of the shaft is preferably between 0.8 and 0.97 times the outer diameter of the shaft. The width of each tooth is preferably between approximately 2 and 5 times the wall thickness of the shaft.

19 Claims, 3 Drawing Sheets

U.S. PATENT DOCUMENTS

| | | | |
|---|---|---|---|
| 5,664,655 A | * 9/1997 | Oh | 403/359.6 |
| 5,697,850 A | 12/1997 | Yaegashi et al. | |
| 5,716,276 A | 2/1998 | Mangas et al. | |
| 5,771,737 A | 6/1998 | Yaegashi | |
| 5,772,520 A | 6/1998 | Nicholas et al. | |
| 5,827,122 A | 10/1998 | Kurian | |
| 5,919,094 A | 7/1999 | Yaegashi | |
| 5,951,402 A | 9/1999 | Baldwin et al. | |
| 6,015,350 A | 1/2000 | Breese | |
| 6,033,310 A | 3/2000 | Faulkenberry | |
| 6,193,612 B1 | 2/2001 | Craig et al. | |
| 6,279,221 B1 | 8/2001 | Glowacki et al. | |

\* cited by examiner

SHAFT SPLINE HAVING A STRAIGHT SIDE TOOTH PROFILE

REFERENCE TO PREVIOUS APPLICATION

This application claims the benefit of U.S. Provisional Application No. 60/315,373, filed on Aug. 27, 2001.

FIELD OF THE INVENTION

The present invention relates generally to shafts adapted for connection to other shafts in a manner that transfers rotational movement. More specifically, the present invention relates to shafts bearing splines for facilitating such a connection.

BACKGROUND OF THE INVENTION

Many situations exist in which it is desirable to transfer rotational movement of one shaft onto a second, coaxial shaft. For example, drive shafts may contain multiple coaxial shafts interconnected in a manner that transfers rotational movement of one shaft onto the other shafts. Frequently, one shaft in this arrangement will define a spline that includes a plurality of teeth designed to interact with recesses on the other shaft. The interaction between the teeth and the recesses effects the transfer of rotational movement between the shafts.

The teeth of the spline can take on a variety of profiles, and many examples of different profiles exist in the prior art. Unfortunately, the tooth profiles taught by the prior art confer poor fitting characteristics onto the shafts. These inadequate fit problems can result in inferior noise, vibration, and harshness (NVH) performance, relatively low durability, high plunge effort under torsional load, and significant weight. Most of these problems are related to a relatively low spline contact rate that results from the use of conventional tooth profiles. Frequently, the teeth of the spline in prior art devices have curved sides, which lead to very high compression stress on the teeth and the above-noted inadequate fit problems.

SUMMARY OF THE INVENTION

The present invention provides a shaft that bears a spline having a plurality of teeth, each having an optimized tooth profile. The tooth profile includes a straight portion in each of the two sides of the tooth. Furthermore, the dimensions of the tooth are optimized based upon various characteristics of the shaft, such as the outer diameter and the wall thickness.

In one embodiment, a shaft according to the present invention comprises a tube having an outer diameter and a spline comprising a plurality of teeth integrally formed by the tube. Each tooth has a top surface that includes at least one point that lies on the outer diameter of the tube. Furthermore, each tooth includes first and second sides, each of which has a straight portion disposed between top and bottom transition regions. The top transition region is preferably a curvilinear connection between the straight portion and the top surface, while the bottom transition region is preferably a curvilinear connection between the straight portion and the main body of the tube. The length of each straight portion is preferably between approximately 0.6 and 0.9 times the length of the side, which includes the top and bottom transition regions.

The present invention can be used in a variety of different shaft types, including drive shafts and half shafts in a vehicle axle. Drive shafts bearing a straight side tooth spline profile according to the present invention have demonstrated significantly improved performance in all of the problematic aspects listed above.

While the invention is defined in the claims appended hereto, additional understanding of the present invention can be obtained by referencing the following detailed description and the appended drawings.

DETAILED DESCRIPTION OF THE PREFERRED EMBODIMENT OF THE PRESENT INVENTION

The following description of preferred embodiments provides examples of the present invention. The embodiments discussed herein are merely exemplary in nature, and are not intended to limit the scope of the invention in any manner. Rather, the description of these preferred embodiments serves to enable a person of ordinary skill in the relevant art to make and use the present invention.

Figure 1:
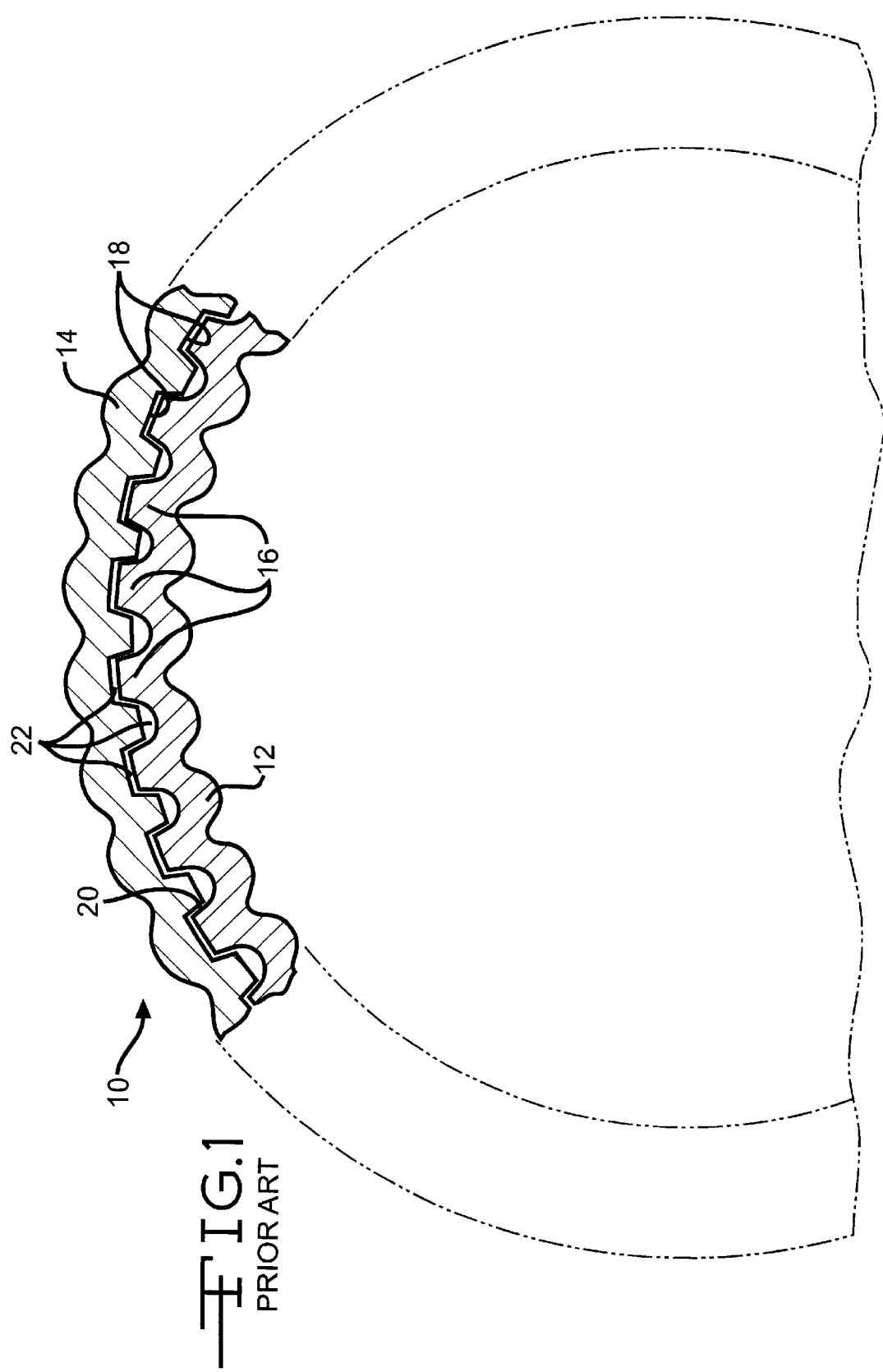
FIG. 1 is a cross-sectional view of a prior art shaft assembly including a conventional spline tooth profile.

FIG. 1 illustrates a prior art shaft assembly 10. The shaft assembly includes an inner tube 12 and outer tube 14. The tubes 12, 14 interact via the combined interaction between a series of teeth 16 on the inner tube 12 and a series of recesses 18 on the outer tube 14. As illustrated in the Figure, the teeth 16 typically include a curvilinear side 20. Due primarily to limitations in manufacturing, the curvilinear side 20 results in an intermittent interaction between the tubes 12, 14. Thus, as a result, a plurality of gaps 22 are present between the tubes 12, 14. The gaps 22 represent areas of low contact between the tubes 12, 14, and contribute to the inadequate fit problems associated with prior art shafts.

Figure 2:
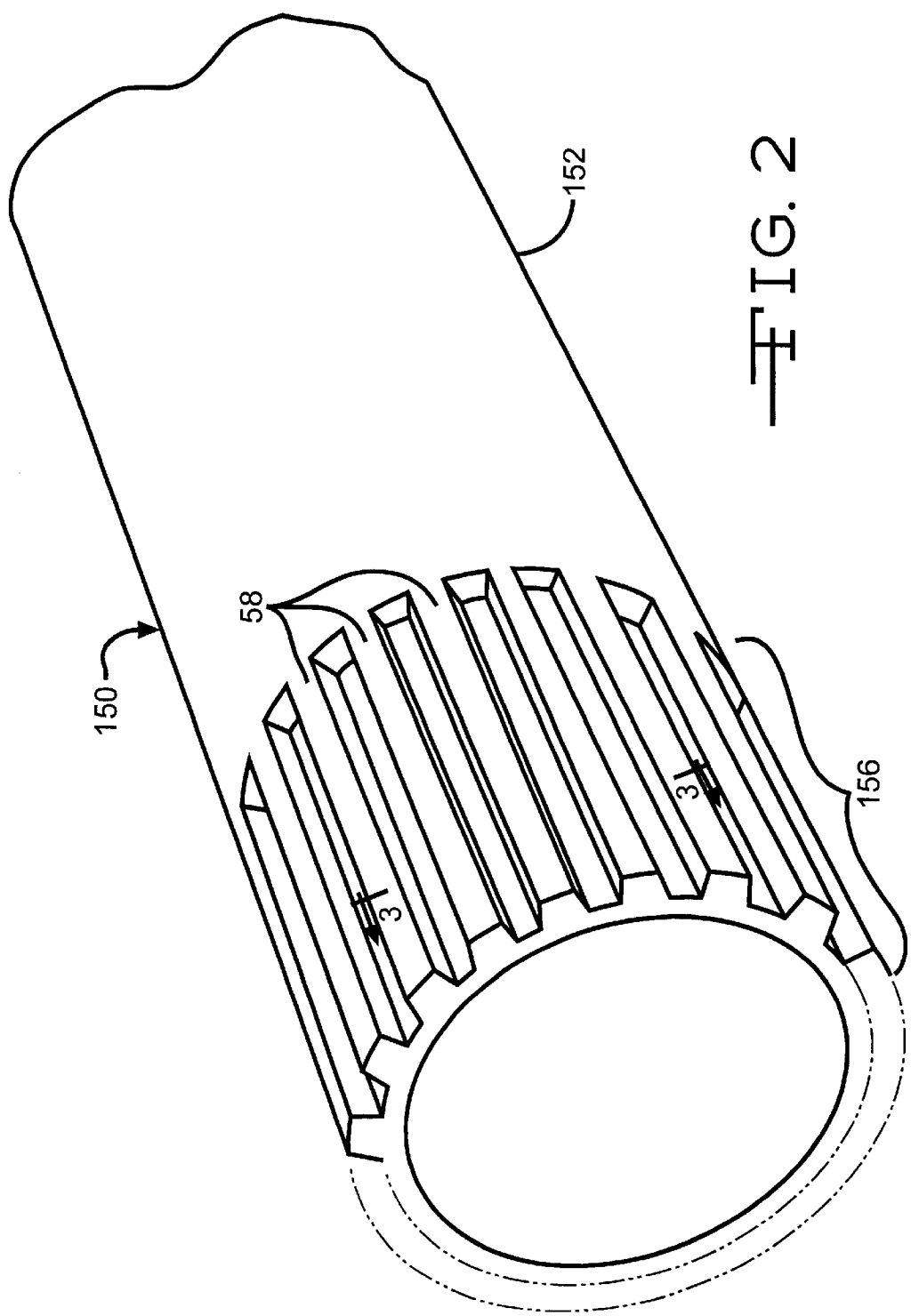
FIG. 2 is a perspective view of a shaft according to a preferred embodiment of the present invention.
Figure 3:
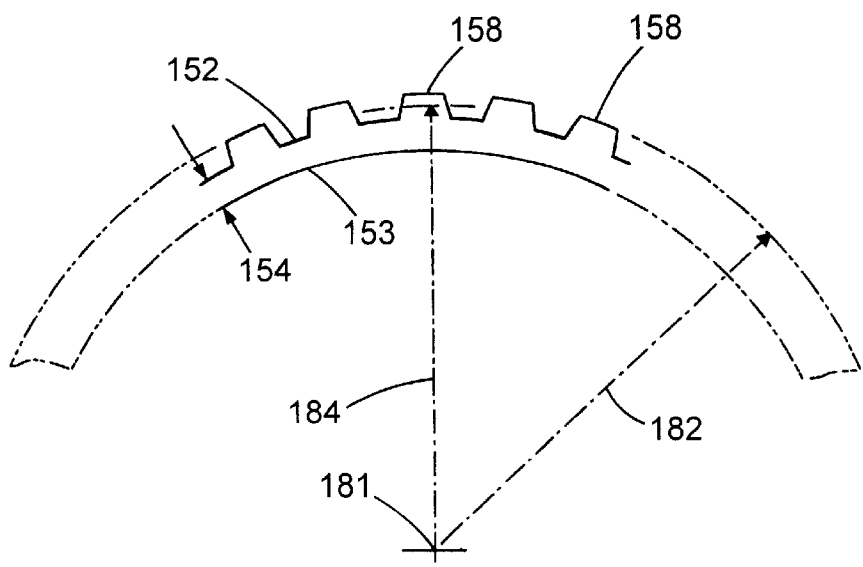
FIG. 3 is a cross-sectional view of the shaft illustrated in FIG. 2 taken along line 3—3.
Figure 4:
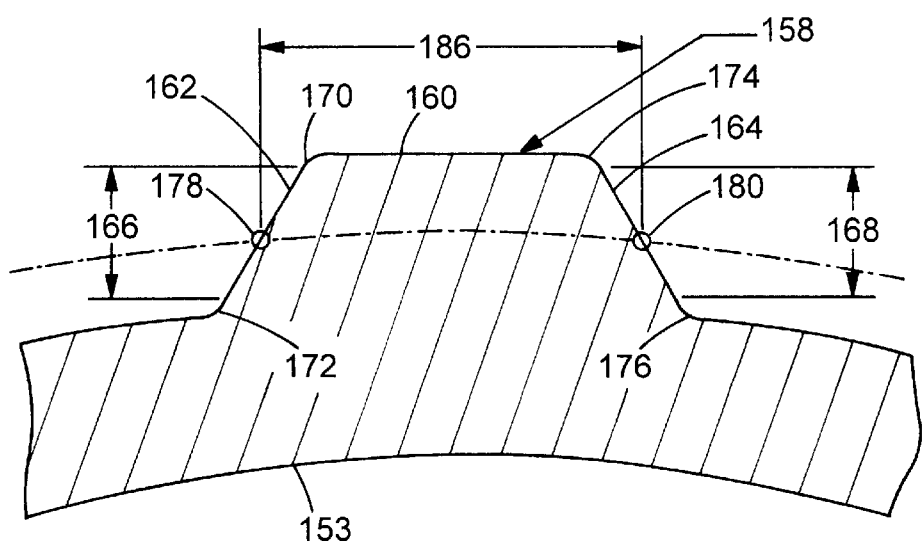
FIG. 4 is a magnified elevational view of the shaft illustrated in FIG. 3.

FIGS. 2 through 4 illustrates a shaft incorporating a preferred embodiment of the present invention. The shaft 150 comprises a tube 152 having a wall thickness 154 and defining a spline 156. The spline 156 comprises a plurality of teeth 158 that extend along at least portion of the length of the shaft 150. As best illustrated in FIG. 4, each tooth 158 of the spline 156 includes a top surface 160 and first 162 and second 164 sides. The first side 162 includes a first straight portion 166 disposed between a first top transition region 170 and a first bottom transition region 172. Likewise, the second side 164 includes a second straight portion 168 disposed between a second top transition region 174 and a second bottom transition region 176. The top transition regions 170,174 represent a connection between the straight portions 166,168 and the top surface 160. Likewise, the bottom transition regions 172, 176 represent connections between the straight portions 166,168 and the wall 153 of the tube 152. Preferably, all transition regions 170, 172, 174, 176 are curvilinear in form. Alternatively, right angles or other suitable angles can be utilized.

The first side 162 includes a first midpoint 178 and the second side 164 similarly includes a second midpoint 180. The midpoints 178,180 represent a point on the side 162, 164 equidistant from the top surface 160 and the wall 153 of the tube 152.

As best illustrated in FIG. 3, the shaft 150 has an outer diameter 182 that extends from the geometric cross-sectional center 181 of the shaft 150 and at least one point on top surface 160 of each tooth. Preferably, the outer diameter 182 terminates at more than one point on the top surface 160 of each tooth 158. Also, the shaft 150 includes a pitch diameter 184 that extends from the geometric cross-sectional center 181 of the shaft 150 to midpoints 178, 180 of each tooth 158. Also, as best illustrated in FIG. 4, each tooth 158 has a width 186 that extends from the first midpoint 178 to the second midpoint 180.

In the preferred embodiment, the length of each straight portion 166, 168 is between approximately 0.6 and 0.9 times the length of the appropriate side 162, 164. Particularly preferable, the length of each straight portion 166, 168 is between approximately 0.7 and 0.8 times the length of the appropriate side 162, 164. Most preferable, the length of each straight portion 166, 168 is equal to approximately 0.75 times the length of the appropriate side 162, 164.

Also preferable, the pitch diameter 184 is preferably between approximately 0.8 and 0.97 times the outer diameter 182. More preferable, the pitch diameter 184 is between approximately 0.85 and 0.92 times the outer diameter 182.

The width 186 of the tooth 158 can be optimized based upon the wall thickness 154 of the tube 152. Preferably, the wall thickness is between approximately 5 and 10 mm. The wall thickness utilized in the shaft will depend on the ultimate application to which the shaft is applied. In automotive applications, such as drive shafts and half shafts in vehicles axles, wall thicknesses between 5 and 10 mm are preferred. More preferable, wall thickness is between approximately 7 and 8 mm. No matter the wall thickness chosen, the width 186 of the tooth 158 is preferably between approximately 2 and 5 times the wall thickness 154.

The overall length of the sides 162, 164, which includes the straight portions 166, 168, the top transition regions 170, 174, and the bottom transition regions 172, 176, is preferably between 0.3 and 0.5 times the width 186 of the tooth 158.

Lastly, the inventors have discovered that an even number of teeth 158 on the shaft 150 results in better surface contact between the shaft 150 and a connected second shaft. Thus, the number of teeth 158 in the plurality of teeth comprising the spline 156 is preferably an even number.

Shafts according to the present invention are advantageously fabricated using cold-forming techniques known to those skilled in the art. Prior to the cold-forming process, a retrogressive heat treat operation, such as the techniques described in U.S. Pat. Nos. 4,766,664 and 5,458,393, can be performed over the spline section of the shaft. This enhances the strength of the splined section. Lastly, artificial aging of the shafts, such as by extended exposure to elevated furnace temperatures, can increase the strength of the shaft.

The foregoing disclosure includes the best mode devised by the inventors for practicing the invention. It is apparent, however, that several variations may be conceivable by one skilled in the art. Inasmuch as the foregoing disclosure is intended to enable such person to practice the instant invention, it should not be construed to be limited thereby, but should be construed to include such aforementioned variations.

We claim:

1. A shaft adapted for connection to another shaft in a manner that transfers rotational movement, the shaft comprising:

a tube having an outer diameter;

a spline comprising a plurality of teeth integrally formed by the tube, each tooth of the plurality of teeth having a top surface with at least one point on the outer diameter, and first and second sides, each of the first and second sides having a straight portion disposed between top and bottom transition regions;

wherein the length of each straight portion is between approximately 0.6 and 0.9 times the length of the side;

wherein the tube has a pitch diameter that terminates at a midpoint of the first and second sides of each tooth in the plurality of teeth; and wherein the pitch diameter is between approximately 0.8 and 0.97 times the outer diameter.

2. The shaft of claim 1, wherein the length of each straight portion is between approximately 0.7 and 0.8 times the length of the side.

3. The shaft of claim 1, wherein the length of each straight portion is approximately 0.75 times the length of the side.

4. The shaft of claim 1, wherein the pitch diameter is between approximately 0.85 and 0.92 times the outer diameter.

5. The shaft of claim 1, wherein each tooth of the plurality of teeth has a width extending between midpoints of the first and second sides;

wherein the tube has a wall thickness; and wherein the width is between approximately 2 and 5 times the wall thickness.

6. The shaft of claim 5, wherein the wall thickness is between approximately 5 and 10 mm.

7. The shaft of claim 5, wherein the wall thickness is between approximately 7 and 8 mm.

8. The shaft of claim 1, wherein each tooth of the plurality of teeth has a width extending between midpoints of the first and second sides; and wherein the length of each side is between approximately 0.3 and 0.5 times the width.

9. The shaft of claim 1, wherein the number of teeth in the plurality of teeth is an even number.

10. A shaft adapted for connection to another shaft in a manner that transfers rotational movement, the shaft comprising:

a tubular body having a wall thickness and an outer diameter;

a spline comprising a plurality of teeth, each tooth of the plurality of teeth having a top surface with at least one point on the outer diameter, a first side having a first straight portion and a first midpoint, a second side having a second straight portion and a second midpoint, and a width extending between the first and second midpoints;

wherein the tubular body has a pitch diameter that terminates at the first and second midpoints and is between approximately 0.8 and 0.97 times the outer diameter;

wherein the width is between approximately 2 and 5 times the wall thickness; and wherein the length of the first and second sides is between approximately 0.3 and 0.5 times the width of the tooth.

11. The shaft of claim 10, wherein the wall thickness is between approximately 5 and 10 mm.

12. The shaft of claim 10, wherein the wall thickness is between approximately 7 and 8 mm.

13. The shaft of claim 11, wherein the length of the first straight portion is between approximately 0.6 and 0.9 times the length of the first side.

14. The shaft of claim 10, wherein the length of the first straight portion is between approximately 0.7 and 0.8 times the length of the first side.

15. The shaft of claim 10, wherein the length of the first straight portion is approximately 0.75 times the length of the first side.

16. The shaft of claim 10, wherein the number of teeth in the plurality of teeth is an even number.

17. A shaft adapted for connection to another shaft in a manner that transfers rotational movement, the shaft comprising:

a tubular body having a wall thickness and an outer diameter;

a spline comprising a plurality of teeth, each tooth of the plurality of teeth having a top surface with at least one point on the outer diameter, and first and second sides, each of the first and second sides having a midpoint and a straight portion disposed between top and bottom curvilinear transition regions;

wherein each tooth of the plurality of teeth has a width extending between the midpoints of the first and second sides that is between approximately 2 and 5 times the wall thickness; and wherein the length of each straight portion is between approximately 0.6 and 0.9 times the length of the side.

18. The shaft of claim 17, wherein the tube has a pitch diameter that terminates at a mid point of the first and second sides of each tooth in the plurality of teeth; and wherein the pitch diameter is between approximately 0.8 and 0.97 times the outer diameter.

19. The shaft of claim 17, wherein the number of teeth in the plurality of teeth is an even number.

\* \* \* \* \*